(12) United States Patent
Shaikh et al.

(10) Patent No.: US 11,501,191 B2
(45) Date of Patent: Nov. 15, 2022

(54) RECOMMENDING MACHINE LEARNING MODELS AND SOURCE CODES FOR INPUT DATASETS

(71) Applicant: International Business Machines Corporation, Armonk, NY (US)

(72) Inventors: Samiulla Shaikh, Bangalore (IN); Sameep Mehta, New Delhi (IN); Manish Bhide, SeriLingamaplly (IN); William B. Lobig, Trabuco Canyon, CA (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 16/138,566

(22) Filed: Sep. 21, 2018

(65) Prior Publication Data

US 2020/0097845 A1  Mar. 26, 2020

(51) Int. Cl.
| | | |
|---|---|---|
| *G06F 15/16* | (2006.01) | |
| *G06K 9/62* | (2022.01) | |
| *G06F 16/24* | (2019.01) | |
| *H04M 3/36* | (2006.01) | |
| *G06F 16/90* | (2019.01) | |
| *G06N 5/04* | (2006.01) | |
| *G06N 20/00* | (2019.01) | |
| *G06F 16/21* | (2019.01) | |

(52) U.S. Cl.
CPC .......... *G06N 5/045* (2013.01); *G06F 16/211* (2019.01); *G06K 9/6267* (2013.01); *G06N 20/00* (2019.01)

(58) Field of Classification Search
CPC ...... G06N 5/045; G06N 20/00; G06F 16/211; G06K 9/6267

USPC ........................................................ 706/1–62
See application file for complete search history.

(56) References Cited

U.S. PATENT DOCUMENTS

| | | | |
|---|---|---|---|
| 6,629,097 B1 | 9/2003 | Keith | |
| 8,589,408 B2* | 11/2013 | Xin | ........................ G06F 16/367 707/748 |
| 9,858,295 B2* | 1/2018 | Murphy-Chutorian | ...................... G06Q 10/00 |
| 10,191,990 B2* | 1/2019 | Sayyadi-Harikandehei | ................ H04N 21/231 |
| 10,592,777 B2* | 3/2020 | Meshi | ..................... G06N 3/049 |
| 2002/0164070 A1 | 11/2002 | Kuhner et al. | |
| 2008/0077544 A1 | 3/2008 | Sureka | |
| 2011/0246409 A1 | 10/2011 | Mitra | |
| 2013/0073490 A1 | 3/2013 | Baughman et al. | |
| 2014/0280214 A1* | 9/2014 | Han | ..................... G06F 16/9535 707/748 |

(Continued)

*Primary Examiner* — Brandon S Cole
(74) *Attorney, Agent, or Firm* — Yee & Associates, P.C.

(57) ABSTRACT

Asset recommendation for a particular input dataset is provided. Candidate data analysis assets having a corresponding relatedness score associated with the particular input dataset greater than a defined relatedness score threshold value are selected. Those candidate data analysis assets having a corresponding relatedness score greater than the defined relatedness score threshold value are ranked by score. Those candidate data analysis assets having a corresponding relatedness score greater than the defined relatedness score threshold value are listed by rank from highest to lowest. A justification for each candidate data analysis asset is inserted in the ranked list of candidate data analysis assets. The ranked list of candidate data analysis assets along with each respective justification is outputted on a display device.

23 Claims, 8 Drawing Sheets

(56) References Cited

U.S. PATENT DOCUMENTS

| | | |
|---|---|---|
| 2016/0132787 A1 | 5/2016 | Drevo et al. |
| 2016/0358099 A1 | 12/2016 | Sturlaugson et al. |
| 2017/0140278 A1 | 5/2017 | Gupta et al. |
| 2017/0286839 A1 | 10/2017 | Parker |
| 2018/0107902 A1* | 4/2018 | Yang .................. G06N 3/084 |
| 2018/0144270 A1* | 5/2018 | Wilson ................ G06N 5/022 |

* cited by examiner

RECOMMENDING MACHINE LEARNING MODELS AND SOURCE CODES FOR INPUT DATASETS

BACKGROUND

1. Field

The disclosure relates generally to data engineering and more specifically to recommending available shared pre-trained machine learning models and source codes that can be applied to classify an input dataset or recommending available shared source codes that can train a machine learning model using the given dataset.

2. Description of the Related Art

Most entities, such as, for example, companies, organizations, institutions, and government agencies, store their data in a variety of formats across a variety of databases and text files. One job of a data scientist is asking the right questions regarding any given dataset, whether large or small, for an entity. Finding the right answers to these questions on any given dataset may be difficult. Data engineering enables data scientists to do their jobs more effectively. For example, data engineering platforms collect and store structured and unstructured data from a multitude of data sources, perform batch processing or real-time processing on the data, and serve the data via an application programming interface (API) to a user, such as data scientist, who is querying it. Data engineering platforms build pipelines that transform the data into formats that users can utilize. In addition, data engineering platforms may utilize a machine learning model or algorithm to run over the stored data to analyze the data and identify patterns in the data.

SUMMARY

According to one illustrative embodiment, a computer-implemented method for asset recommendation for a particular input dataset is provided. A computer selects candidate data analysis assets having a corresponding relatedness score associated with the particular input dataset greater than a defined relatedness score threshold value. The computer ranks those candidate data analysis assets having a corresponding relatedness score greater than the defined relatedness score threshold value by score. The computer lists those candidate data analysis assets having a corresponding relatedness score greater than the defined relatedness score threshold value by rank from highest to lowest. The computer inserts a justification for each candidate data analysis asset in the ranked list of candidate data analysis assets. The computer outputs the ranked list of candidate data analysis assets along with each respective justification on a display device. According to other illustrative embodiments, a computer system and computer program product for asset recommendation for a particular input dataset are provided.

The different illustrative embodiments also calculate a relatedness score between the particular input dataset and a plurality of candidate data analysis assets stored on the computer based on semantics corresponding to the particular input dataset and semantics corresponding to each candidate data analysis asset of the plurality of candidate data analysis assets. The relatedness score is a measure of strength of relationship between a particular candidate data analysis asset and the particular input dataset. The plurality of candidate data analysis assets includes machine learning models and source codes. The semantics corresponding to the particular input dataset include schema and content of the particular input dataset, types of users who have used the particular input dataset previously, types of problems that users were trying to solve using the particular input dataset, types of data pattern analysis algorithms, data transformations, and source codes previously applied to the particular input dataset, and machine learning models previously trained using the particular input dataset. The semantics corresponding to each candidate data analysis asset include domain, schema, and content of data used to train each particular candidate data analysis asset.

Thus, the different illustrative embodiments recommend an appropriate pre-trained machine learning model or source code that can be effectively applied for classifying a given input dataset or recommend a source code that can train a machine learning model using the given input dataset. As a result, illustrative embodiments are useful for identifying potential uses of the given input dataset, identifying machine learning models created by other users that utilized the given input dataset for a particular task, and finding best matching machine learning models and source codes for performing various tasks on the given input dataset. In addition, illustrative embodiments identify related work in a specific area using the given input dataset or similar datasets. Further, illustrative embodiments decrease user cost in terms of time and effort by providing all compatible and potentially useful source codes and pre-trained machine learning models.

DETAILED DESCRIPTION

Figure 1:
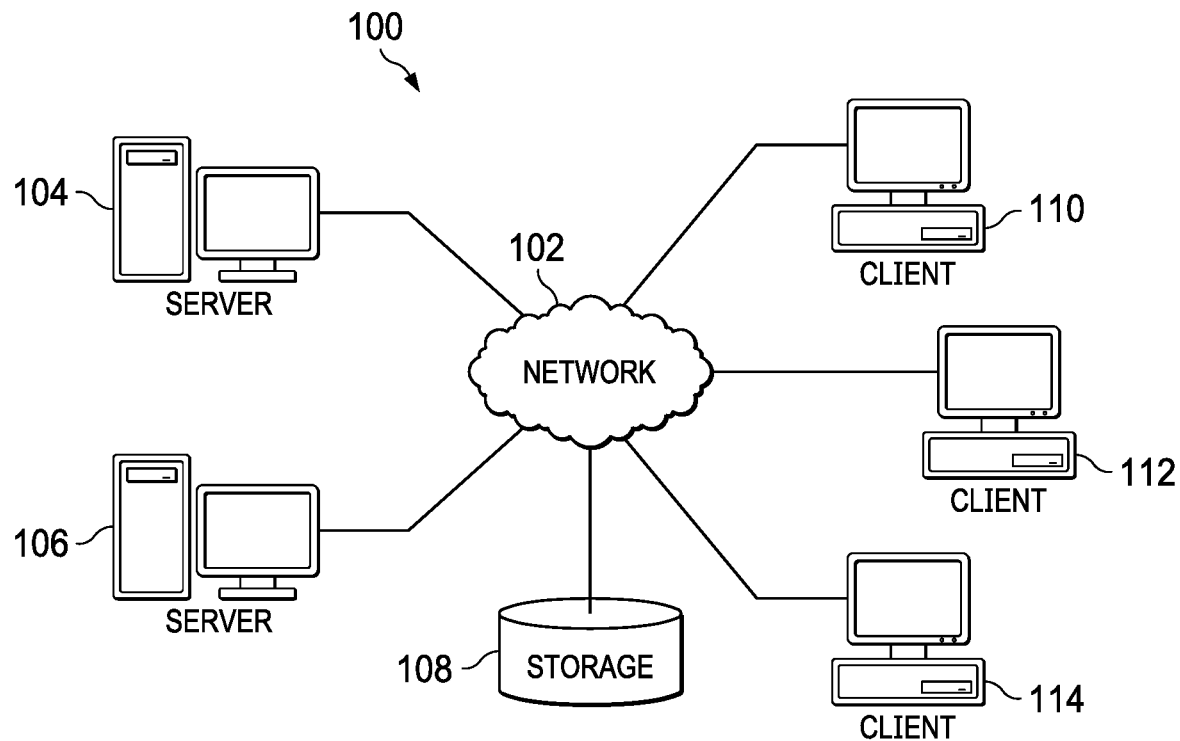
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
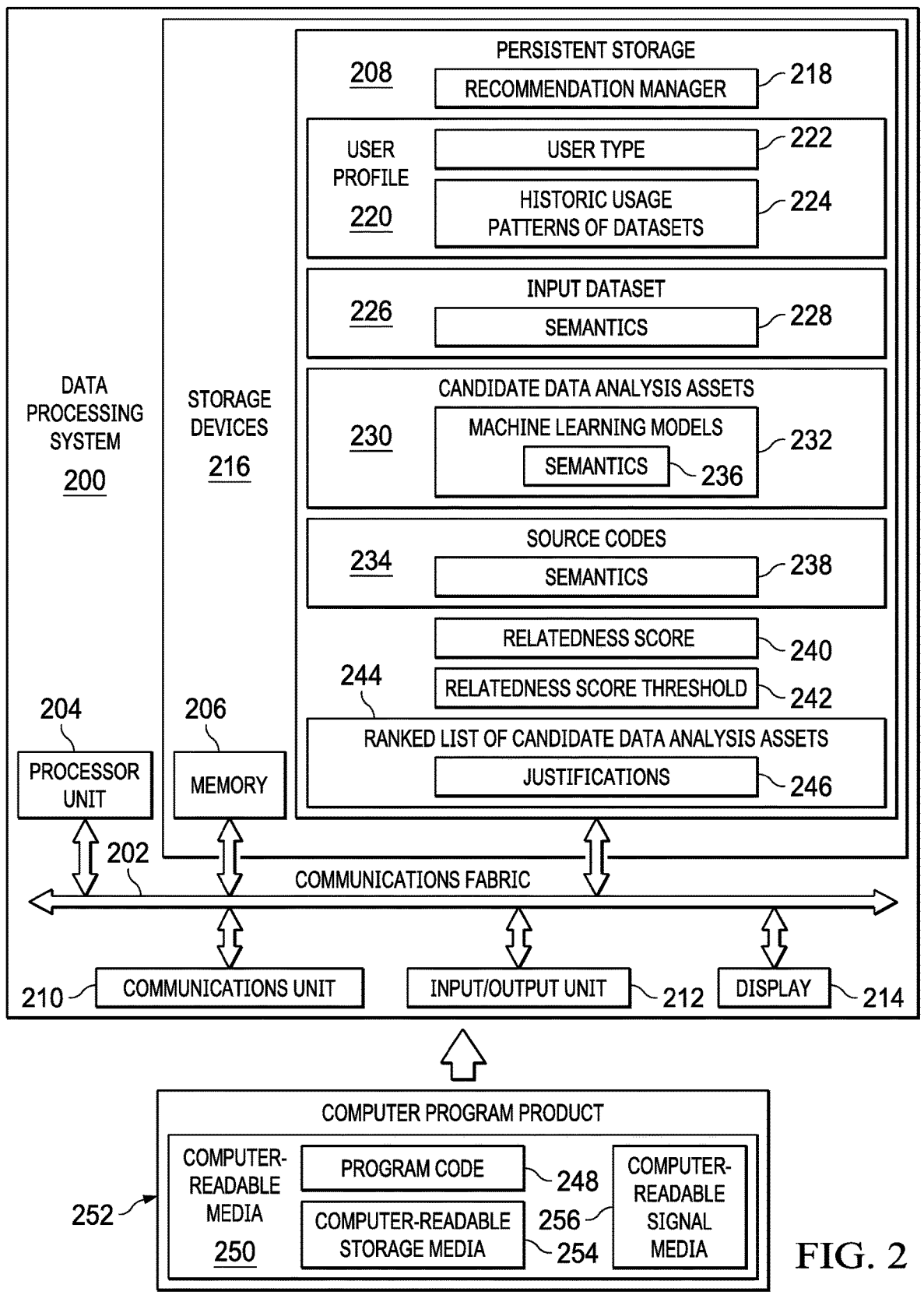
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may be data engineering platforms that host a set of services to registered client devices for recommending available shared pre-trained machine learning models and source codes that can be applied to classify an input dataset and recommending available shared source codes that can train a machine learning model using the given dataset. Further, server 104 and server 106 may each represent a cluster of servers in a data center. Alternatively, server 104 and server 106 may represent computing nodes in a cloud environment that provides data analysis asset (i.e., machine learning model or source code) recommendation services.

Client 110, client 112, and client 114 also connect to network 102. Clients 110, 112, and 114 are registered clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, and the like, with wire or wireless communication links to network 102. Users of clients 110, 112, and 114 may utilize clients 110, 112, and 114 to access and utilize the data analysis asset recommendation services hosted by server 104 and server 106.

Storage 108 is a network storage device capable of storing any type of dataset in a structured format or an unstructured format. In addition, storage 108 may represent a plurality of different network storage devices located locally to server 104 and server 106 and/or located remotely. Further, storage 108 may store identifiers and IP addresses for a plurality of client devices; identifiers for a plurality of client device users; profiles for each of the plurality of client device users; a plurality of different datasets corresponding to a plurality of different data domains; a plurality of pre-trained machine learning models; a plurality of different source codes; semantics corresponding to each of the plurality of datasets, machine learning models, and source codes; and the like. Furthermore, storage unit 108 may store authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores recommendation manager 218. However, it should be noted that even though recommendation manager 218 is illustrated as residing in persistent storage 208, in an alternative illustrative embodiment recommendation manager 218 may be a separate component of data processing system 200. For example, recommendation manager 218 may be a hardware component coupled to communication fabric 202 or a combination of hardware and software components. In another alternative illustrative embodiment, a first set of components of recommendation manager 218 may be located in data processing system 200 and a second set of components of recommendation manager 218 may be located in a second data processing system, such as client 110 in FIG. 1. In yet another alternative illustrative embodiment, recommendation manager 218 may be located in client devices in addition to, or instead of, data processing system 200.

Recommendation manager 218 controls the process of recommending available shared pre-trained machine learning models and source codes that can be applied to classify an input dataset and recommending available shared source codes that can train a machine learning model using the given dataset. Recommendation manager 218 utilizes user profile 220 to assist in generating recommendations for data analysis assets, such as machine learning models and source codes. It should be noted that user profile 220 represents a plurality of different profiles that correspond to a plurality of different data engineering platform users.

In this example, user profile 220 includes user type 222 and historic usage patterns of datasets 224. User type 222 represents the type or class of data engineering platform user that corresponds to user profile 220. User type 222 may be, for example, a machine learning model consumer, a machine learning model provider, a data scientist, or the like. Historic usage patterns of datasets 224 represent a pattern of dataset use by the user corresponding to user profile 220.

Input dataset 226 represents the set of data that recommendation manager 218 is analyzing to generate the data analysis asset recommendations. Input dataset 226 may be a previously stored set of data within data processing system 200 or may be a new set of data uploaded by a client device user from a remote data repository or database to data processing system 200. Input dataset 226 may be from any data domain, such as, for example, a banking data domain, a medical data domain, an insurance data domain, a governmental data domain, an educational data domain, a financial data domain, a sports data domain, an entertainment data domain, and the like. In addition, input dataset 226 may be in a structured format or an unstructured format.

Semantics 228 represent the features, attributes, and characteristics that correspond to input dataset 226. Semantics 228 may include, for example, schema and content of input dataset 226; types of users who have previously used input dataset 226; types of problems that users were trying to solve using input dataset 226; types of data pattern analysis algorithms, data transformations, and/or source codes previously applied to input dataset 226; and machine learning models previously generated using input dataset 226. Recommendation manager 218 also utilizes semantics 228 of input dataset 226 to generate the data analysis asset recommendations.

Candidate data analysis assets 230 represent a plurality of previously stored data analysis resources. In this example, candidate data analysis assets 230 include machine learning models 232 and source codes 234. However, it should be noted that candidate data analysis assets 230 may include other resources, such as, for example, data pattern analysis algorithms, and the like.

Machine learning models 232 represent a plurality of different machine learning models that have been previously trained on datasets from a plurality of different data domains. Semantics 236 represent the features, attributes, and characteristics that correspond to each machine learning model in machine learning models 232. Semantics 236 may include, for example, the semantic profile corresponding to the dataset that was previously used trained a particular machine learning model and the specification information or properties of that particular machine learning model.

Source codes 234 represent a plurality of different sets of software code for training different types of machine learning models on how to classify different datasets and for determining how to utilize the different classified datasets (e.g., what type of task is a particular dataset capable of performing). However, it should be noted that source codes 234 can be trained to classify input datasets as well. Semantics 238 represent the features, attributes, and characteristics that correspond to each set of software code in source codes 234. Semantics 238 may include, for example, the semantic profile corresponding to the dataset that trained a particular set of source code and the specification information or properties of that particular set of source code.

Recommendation manager 218 generates relatedness score 240 for each machine learning model in machine learning models 232 and each set of source code in source codes 234 as they correlate to input dataset 226. In other words, relatedness score 240 represents a degree of similarity or closeness (i.e., measure of strength of relationship) that a particular machine learning model or a particular set of source code has with input dataset 226. Recommendation manager 218 computes relatedness score 240 based on comparing semantics 228 of input dataset 226 with semantics 236 of each machine learning model in machine learning models 232 and semantics 238 of each set of source codes in source codes 234.

After recommendation manager 218 generates relatedness score 240 for each machine learning model in machine learning models 232 and each set of source codes in source codes 234, recommendation manager 218 compares relatedness score 240 for each machine learning model in machine learning models 232 and each set of source codes in source codes 234 with relatedness score threshold 242. Relatedness score threshold 242 represents a predefined minimum relatedness score value. In other words, recommendation manager 218 selects those candidate data analysis assets (i.e., machine learning models and source codes) having a corresponding relatedness score greater than relatedness score threshold 242 and no longer considers those data analysis assets having a corresponding relatedness score less than relatedness score threshold 242 as viable candidates.

Further, recommendation manager 218 ranks each of the candidate data analysis assets having a corresponding relatedness score greater than relatedness score threshold 242 from highest-ranking to lowest-ranking based on score. Afterward, recommendation manager 218 generates ranked list of candidate data analysis assets 244 from highest-ranking to lowest-ranking. Ranked list of candidate data analysis assets 244 represents a set of one or more recommended data analysis assets for a user to review and select from. Moreover, recommendation manager 218 inserts justification 246 for each candidate data analysis asset in the ranked list. Justification 246 represents a rationale, basis, or reasoning for including a particular data analysis asset in the ranked list. Furthermore, recommendation manager 218 displays ranked list of candidate data analysis assets 244 on a display of a client device corresponding to the user.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system by including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Data engineering platforms have large pool of shared datasets, machine learning models, and source codes. Understanding such datasets, machine learning models, or the source codes takes considerable time for new users. Given the large number of these assets, it is impracticable for any user to check all the available assets and decide which of these assets could be used for a particular task that a user is planning to perform.

Illustrative embodiments equip a user, such as, for example, a data scientist, a machine learning consumer, a machine learning provider, and the like, via smart recommendations, with the following abilities: 1) find an appropriate pre-trained machine learning model or source code that can be effectively applied for classifying a given input dataset; and 2) find a source code that can train a machine learning model using the given input dataset. Illustrative embodiments base these recommendations on semantics of the given input dataset, available existing machine learning models and source codes, and their respective historical usage patterns by data engineering platform users.

Illustrative embodiments learn the semantics of the given input dataset using features, characteristics, and attributes, such as, for example: schema and content of the given input dataset; types of users who have used the given input dataset previously; types of problems that users were trying to solve using the given input dataset; types of data pattern analysis algorithms, data transformations, and/or source codes previously applied to the given input dataset; and machine learning models previously trained using the given dataset.

Illustrative embodiments analyze the input data using, for example: historical usage patterns of similar datasets, machine learning models, and sources codes; schema and content of the input data; and specifications of the machine learning models and source codes stored in the data engineering platform. Then, illustrative embodiments recommend existing pre-trained machine learning models or source codes for the input data based on the analysis. The trained machine learning models can predict an output class for candidate rows in the input data or the source codes can train a machine learning model using the input data. The input data may either be selected on a storage device of the data engineering platform by a user or may be imported on the data engineering platform from publicly available data repositories.

As soon as a user accesses any stored dataset on the data engineering platform, illustrative embodiments use the dataset's pre-computed semantics to find matching machine learning models or source codes that can classify the input data or find a source code to train a machine learning model using the input data. Thus, illustrative embodiments may be useful for identifying potential uses of the dataset, identifying machine learning models created by other users that utilized the input dataset for a particular task, and finding best matching machine learning models and source codes for performing various tasks on the input dataset. In addition, illustrative embodiments identify related work in a specific area using the given input dataset or similar datasets. Further, illustrative embodiments decrease user cost in terms of time and effort by providing all compatible and potentially useful source codes and pre-trained machine learning models. As a result, illustrative embodiments provide an improved user experience.

Data engineering is rapidly migrating to cloud-based servers from traditional self-managed or third party managed dedicated servers. With this migration, large pools of in-platform public resources are formed, which in turn add value to existing cloud-based platforms. This migration helps in fast accumulation of large datasets, which illustrative embodiments can utilize to train machine learning models for various tasks. Illustrative embodiments add further value by helping users quickly identify potential uses of available datasets and decide on a best way to utilize those datasets for the users' own purposes. Thus, illustrative embodiments are applicable to subscription-based, cloud-hosted data engineering platforms as well.

Figure 3:
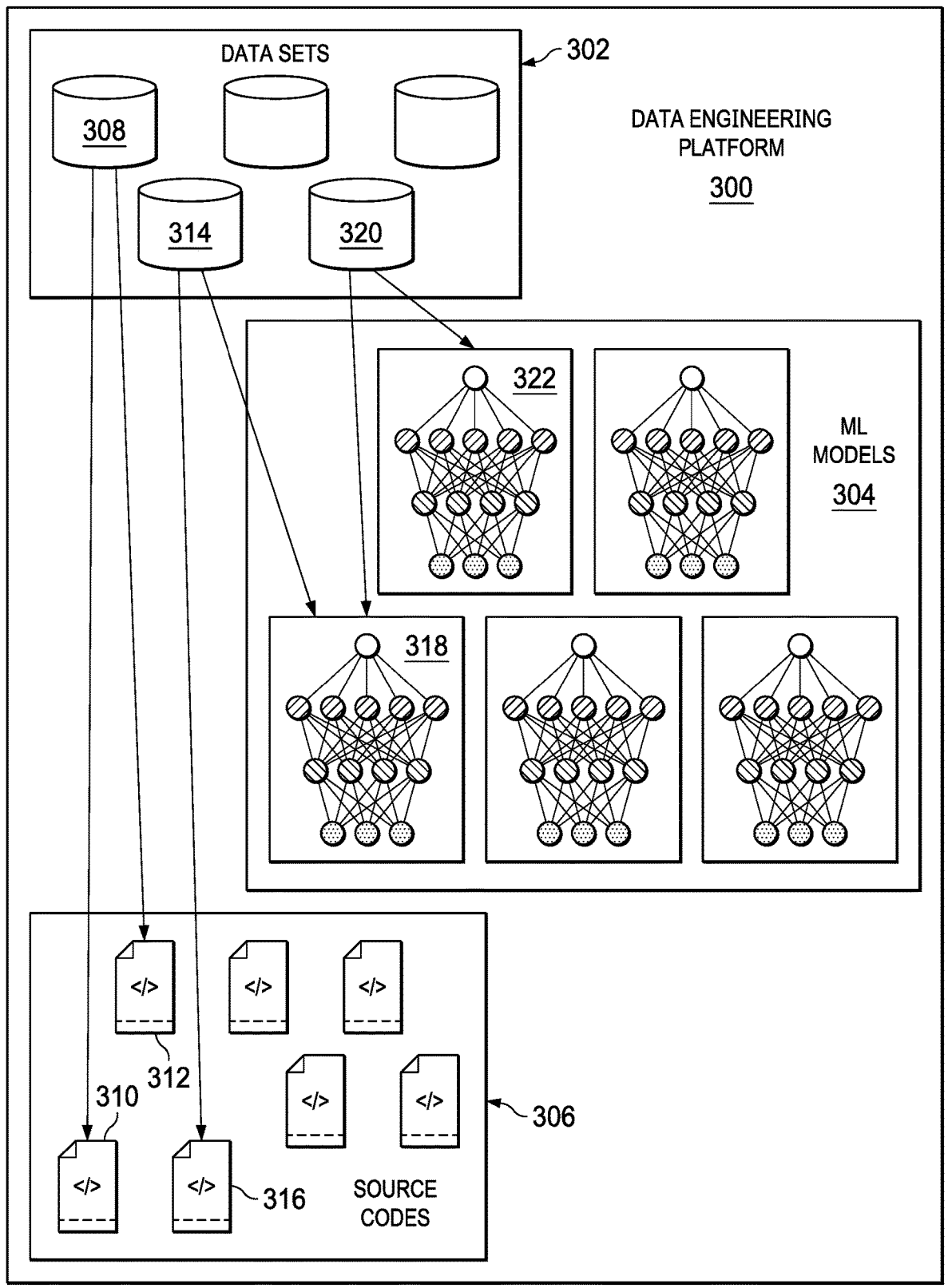
FIG. 3 is a diagram illustrating an example of a data engineering platform in accordance with an illustrative embodiment.

With reference now to FIG. 3, a diagram illustrating an example of a data engineering platform is depicted in accordance with an illustrative embodiment. Data engineering platform 300 may be, for example, server 104 in FIG. 1 or data processing system 200 in FIG. 2. In this example, data engineering platform 300 includes datasets 302, machine learning models 304, and source codes 306, such as, for example, input dataset 226, machine learning models 232, and source codes 234 in FIG. 2. This example also illustrates that dataset 308 is related to source code 310 and source code 312, dataset 314 is related to source code 316 and machine learning model 318, and dataset 320 is related to machine learning model 318 and machine learning model 322. However, it should be noted that any particular dataset may be related to a plurality of (e.g., more than two) source codes and/or machine learning models.

Figure 4:
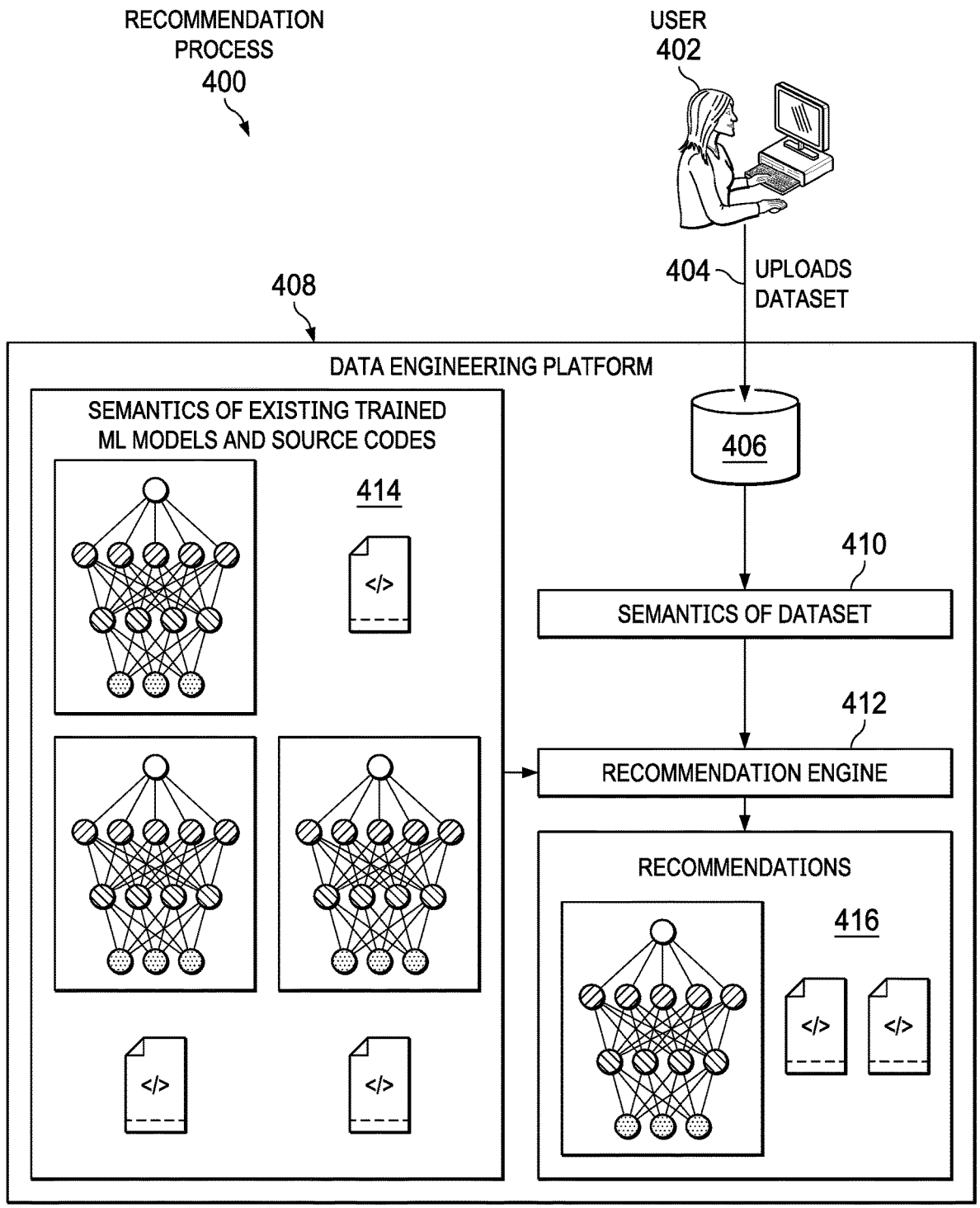
FIG. 4 is a diagram illustrating an example of a recommendation process in accordance with an illustrative embodiment.

With reference now to FIG. 4, a diagram illustrating an example of a recommendation process is depicted in accordance with an illustrative embodiment. Recommendation process 400 starts when user 402 on a client device, such as client 110 in FIG. 1, uploads dataset 404, such as input dataset 226 in FIG. 2, to storage device 406 located on data engineering platform 408. Data engineering platform 408 may be, for example, server 104 in FIG. 1, data processing system 200 in FIG. 2, or data engineering platform 300 in FIG. 3. Alternatively, user 402 may select a dataset previously stored in storage device 406.

At 410, data engineering platform 408 utilizes recommendation engine 412, such as recommendation manager 218 in FIG. 2, to determine semantics of dataset 404. At 414, data engineering platform 408 utilizes recommendation engine 412 to retrieve semantics of existing trained machine learning models and source codes. Then, recommendation engine 412 compares the semantics of dataset 404 with the semantics of the existing trained machine learning models and source codes to generate recommendations 416. Recommendations 416 may be, for example, ranked list of candidate data analysis assets 244 with justifications 246 in FIG. 2. Recommendation engine 412 displays recommendations 416 on the client device corresponding to user 402.

Figure 5:
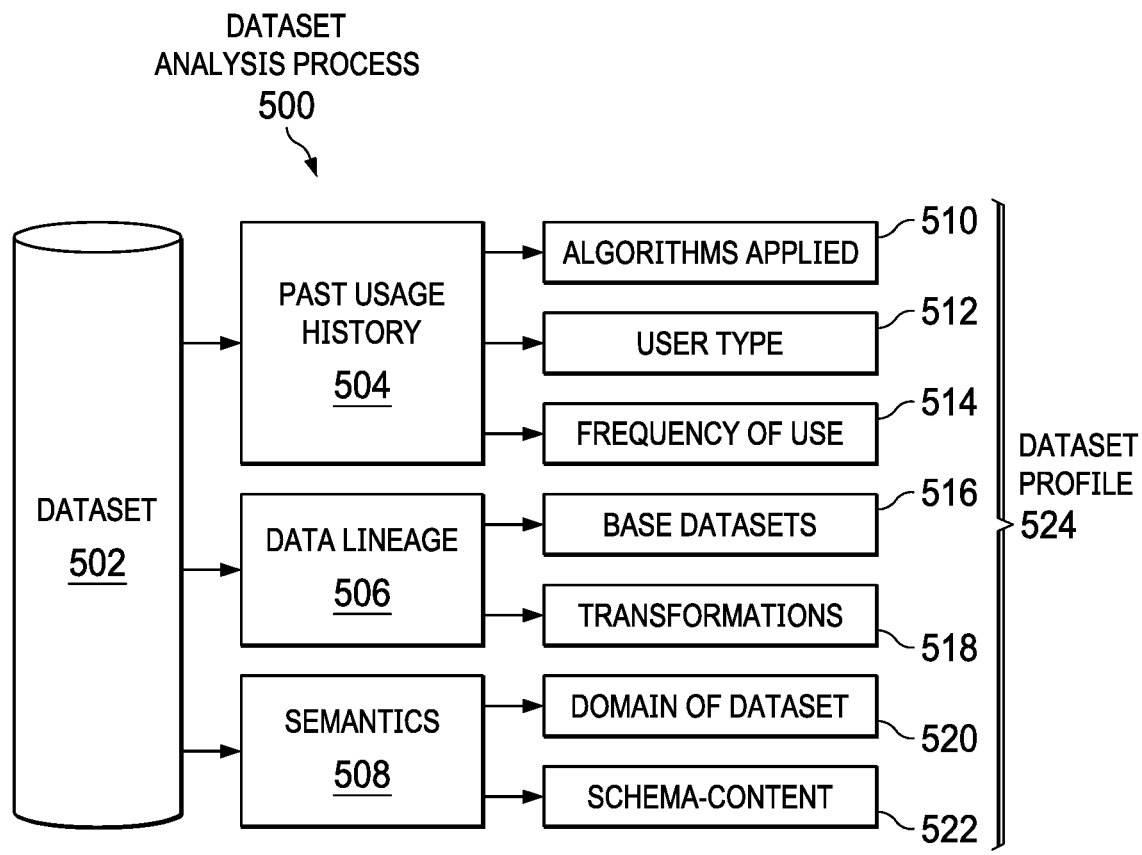
FIG. 5 is a diagram illustrating an example of a dataset analysis process in accordance with an illustrative embodiment.

With reference now to FIG. 5, a diagram illustrating an example of a dataset analysis process is depicted in accordance with an illustrative embodiment. Dataset analysis process 500 may be implemented in a data engineering platform, such as data engineering platform 408 in FIG. 4. Dataset analysis process 500 starts when a user, such as, for example, user 402 in FIG. 4, either selects dataset 502, which would have been previously stored on the data engineering platform, or uploads dataset 502 from a remote data repository or database. Then, data analysis process 500 determines past usage history 504, data lineage 506, and semantics 508, which correspond to dataset 502.

In this example, past usage history 504 includes algorithms applied 510, user type 512, and frequency of use 514. Algorithms applied 510 represent the types of algorithms, such as data pattern analysis algorithms, previously applied to dataset 502 or datasets similar to dataset 502. User type 512 represents the types of data engineer platform users who previously used dataset 502 or datasets similar to dataset 502. Frequency of use 514 represents the number of times dataset 502 or datasets similar to dataset 502 were used by data engineering platform users.

Data lineage 506 includes base datasets 516 and transformations 518. Base datasets 516 represent a set of one or more datasets that were used to build dataset 502. Transformations 518 represent a set of one or more changes or alternations, such as additions, deletions, and modifications, to dataset 502. Semantics 508 include domain of data 520 and schema-content 522. Domain of data 520 represents the field or area dataset 502 belongs to, such as, for example, a financial data domain or medical data domain. Schema-content 522 represent the structure and content of dataset 502.

Data analysis process 500 generates dataset profile 524, which corresponds to dataset 502, using information corresponding to algorithms applied 510, user type 512, frequency of use 514, base datasets 516, transformations 518, domain of data 520, and schema-content 522. However, it should be noted that alternative illustrative embodiments may use more or less information than shown to generate dataset profile 524.

Figure 6:
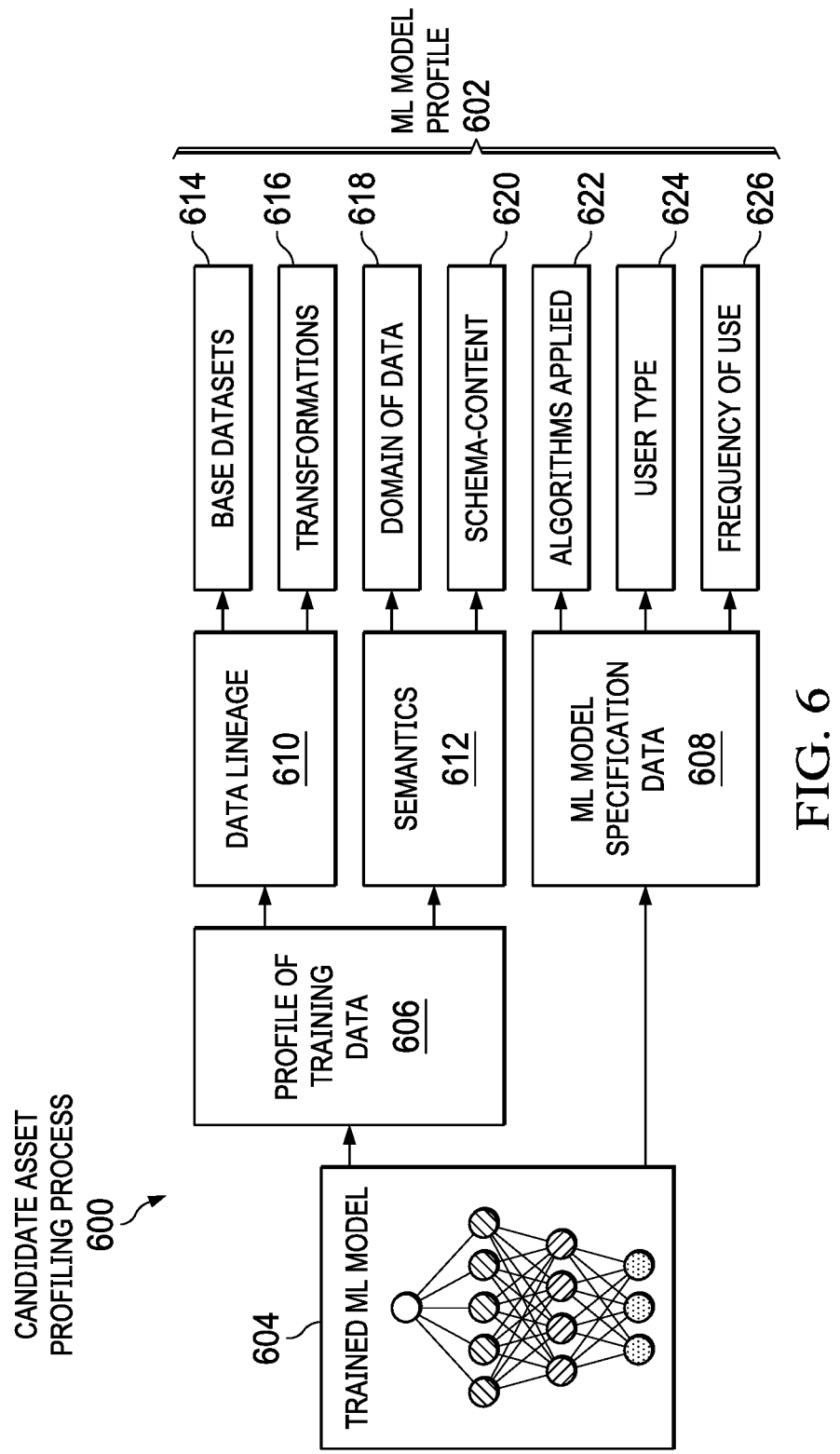
FIG. 6 is a diagram illustrating an example of a candidate asset profiling process in accordance with an illustrative embodiment.

With reference now to FIG. 6, a diagram illustrating an example of a candidate asset profiling process is depicted in accordance with an illustrative embodiment. Candidate asset profiling process 600 may be implemented in a data engineering platform, such as data engineering platform 408 in FIG. 4. Candidate asset profiling process 600 generates machine learning model profile 602 for each trained machine learning model, such as trained machine learning model 604, stored on the data engineering platform. Candidate asset profiling process 600 generates machine learning model profile 602 for trained machine learning model 604 using profile of training data 606 and machine learning model specification data 608.

Profile of training data 606 represents information corresponding to the dataset that was previously used to train trained machine learning model 604. Profile of training data 606 may be, for example, dataset profile 524. Machine learning model specification data 608 represent information corresponding to the requirements, description, and design of trained machine learning model 606.

In this example, profile of training data 606 includes data linage 610 and semantics 612, such as, for example, data linage 506 and semantics 508 in FIG. 5. In addition, data linage 610 includes base datasets 614 and transformations 616, such as, for example, base datasets 516 and transformations 518 in FIG. 5. Semantics 612 includes domain of data 618 and schema-content 620, such as, for example, domain of data 520 and schema-content 522 in FIG. 5.

Machine learning model specification data 608 includes algorithms applied 622, user type 624, and frequency of use 626. Algorithms applied 622 represent the types of algorithms previously applied to trained machine learning model 604. User type 624 represents the types of data engineer platform users who previously used trained machine learning model 604. Frequency of use 626 represents the number of times trained machine learning model 604 was used by data engineering platform users. It should be noted that candidate asset profiling process 600 also will generate a source code profile for each candidate source code using similar steps.

Figure 7:
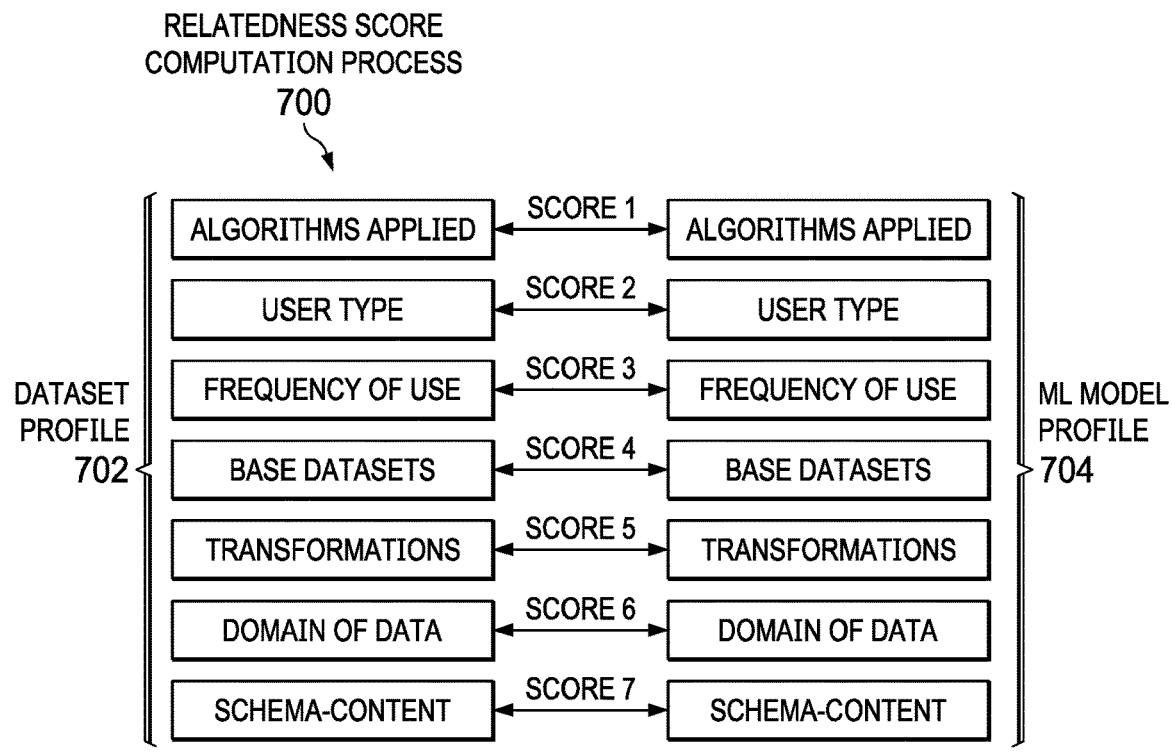
FIG. 7 is a diagram illustrating an example of a relatedness score computation process in accordance with an illustrative embodiment.

With reference now to FIG. 7, a diagram illustrating an example of a relatedness score computation process is depicted in accordance with an illustrative embodiment. Relatedness score computation process 700 may be implemented in a data engineering platform, such as data engineering platform 408 in FIG. 4. Relatedness score computation process 700 analyzes and compares the information contained in dataset profile 702 with the information contained in machine learning model profile 704. Dataset profile 702 may be, for example, dataset profile 524 in FIG. 5. Machine learning model profile 704 may be, for example, machine learning model profile 602 in FIG. 6.

After analyzing and comparing the information contained within dataset profile 702 and machine learning model profile 704, relatedness score computation process 700 generates a relatedness score for each aspect of information, such as algorithms applied, user type, frequency of use, base datasets, transformations, domain of data, and schema-content, contained within the profiles. Each relatedness score determines a strength of relationship between the same aspect of information.

In addition, relatedness score computation process 700 may apply different weights to different aspects of information. In other words, different aspects, such as frequency of use and user type may have a greater significance than other aspects, such as transformations. The weights may be, for example, predefined weights, default weights, or generic weights. Further, relatedness score computation process 700 sums the relatedness scores to determine a final relatedness score for the machine learning model corresponding to machine learning model profile 704. Relatedness score computation process 700 may utilize an equation, such as, for example, $\Sigma_i W_i * score_i$, to calculate the final relatedness score.

Figure 8:
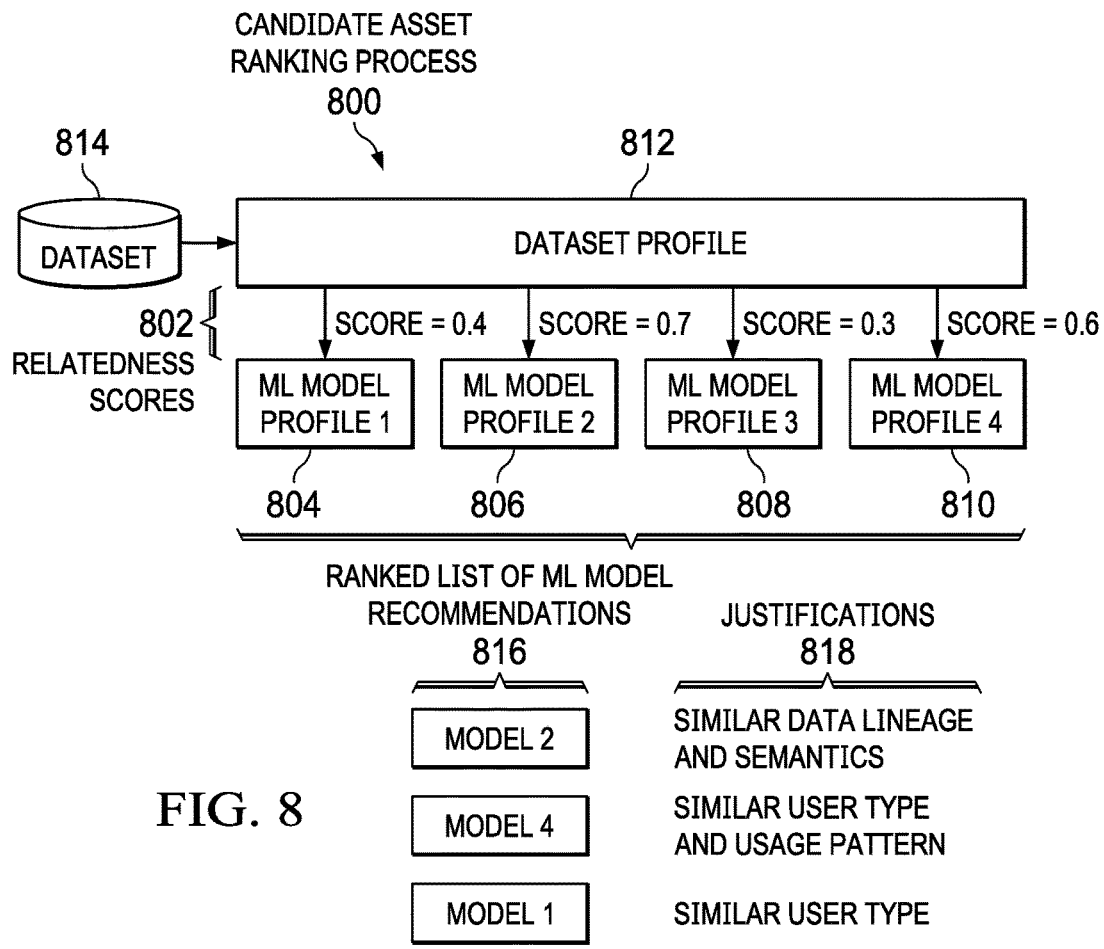
FIG. 8 is a diagram illustrating an example of a candidate asset ranking process in accordance with an illustrative embodiment.

With reference now to FIG. 8, a diagram illustrating an example of a candidate asset ranking process is depicted in accordance with an illustrative embodiment. Candidate asset ranking process 800 may be implemented in a data engineering platform, such as data engineering platform 408 in FIG. 4. Candidate asset ranking process 800 compares relatedness scores 802, which correspond to machine learning model profile 1 804, machine learning model profile 2 806, machine learning model profile 3 808, and machine learning model profile 4 810, as they correlate to dataset profile 812, which corresponds to dataset 814. Dataset profile 812 may be, for example, dataset profile 702 in FIG. 7. Machine learning model profile 1 804 may be, for example, machine learning model profile 704 in FIG. 7.

In this example, machine learning model profile 1 804 has as relatedness score of 0.4, machine learning model profile 2 806 has as relatedness score of 0.7, machine learning model profile 3 808 has as relatedness score of 0.3, and machine learning model profile 4 810 has as relatedness score of 0.6. In other words, machine learning model profile 1 804 has a 40% strength of relationship with dataset profile 812, machine learning model profile 2 806 has a 70% strength of relationship with dataset profile 812, machine learning model profile 3 808 has a 30% strength of relationship with dataset profile 812, and machine learning model profile 4 810 has a 60% strength of relationship with dataset profile 812.

Candidate asset ranking process 800 lists the machine learning models corresponding to machine learning model profile 1 804, machine learning model profile 2 806, machine learning model profile 3 808, and machine learning model profile 4 810 within ranked list of machine learning model recommendations 816 according to their respective relatedness scores. Thus, candidate asset ranking process 800 recommends machine learning model 2 first, machine learning model 4 second, and machine learning model 1 third based on corresponding scores. Moreover, candidate asset ranking process 800 lists justifications 818 with each recommended machine learning model in the ranked list.

Figure 9:
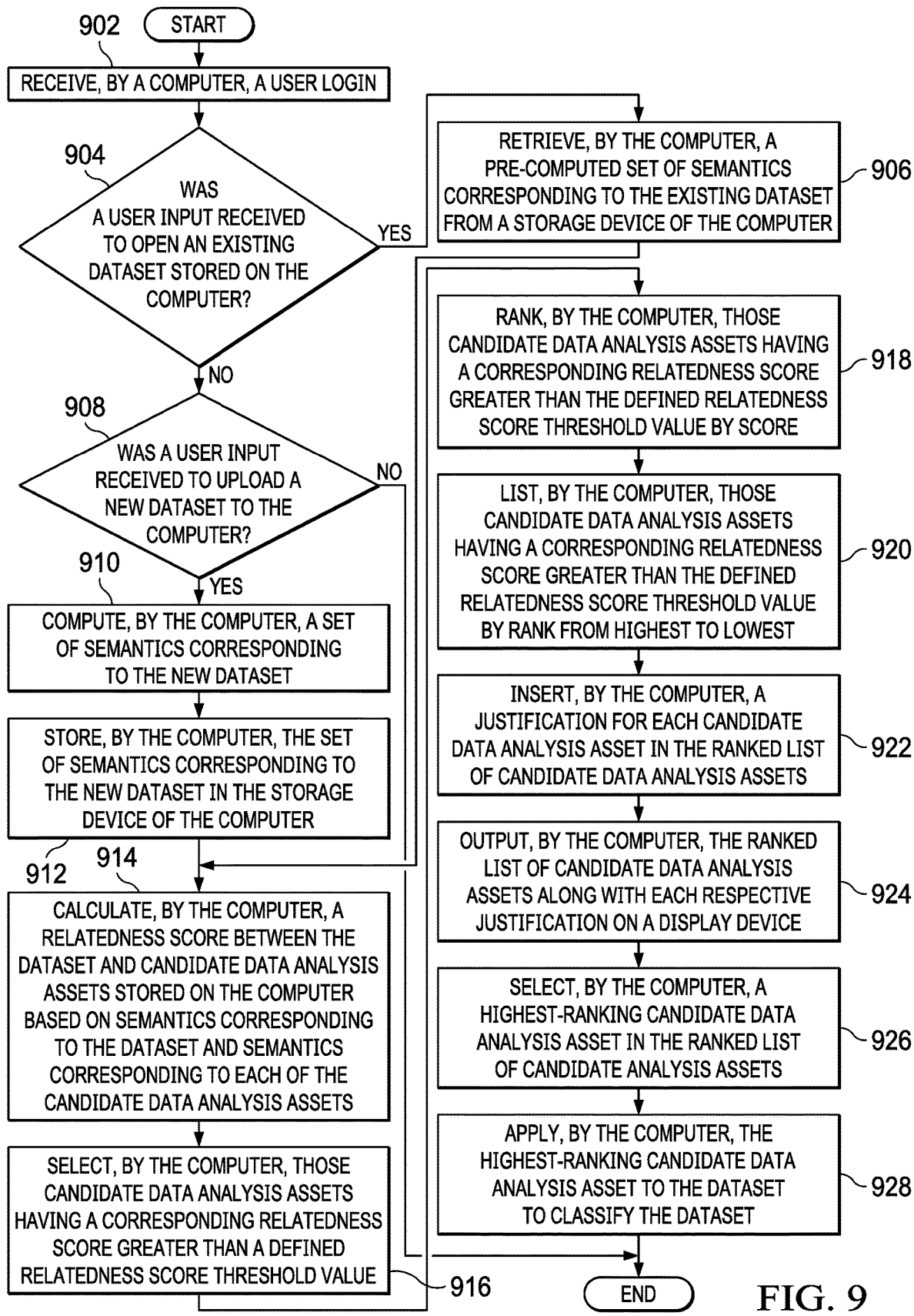
FIG. 9 is a flowchart illustrating a process for outputting a ranked list of recommended data analysis assets in accordance with an illustrative embodiment.

With reference now to FIG. 9, a flowchart illustrating a process for outputting a ranked list of recommended data analysis assets is shown in accordance with an illustrative embodiment. The process shown in FIG. 9 may be implemented in a computer, such as, for example, server 104 in FIG. 1, data processing system 200 in FIG. 2, data engineering platform 300 in FIG. 3, or data engineering platform 406 in FIG. 4.

The process begins when the computer receives a user login (step 902). After verifying that the user login is an authentic login, the computer makes a determination as to whether the computer received a user input to open an existing dataset stored on the computer (step 904). If the computer determines that the computer received a user input to open an existing dataset stored on the computer, yes output of step 904, then the computer retrieves a pre-computed set of semantics corresponding to the existing dataset from a storage device of the computer (step 906). Thereafter, the process proceeds to step 914.

If the computer determines that a user input was not received to open an existing dataset stored on the computer, no output of step 904, then the computer makes a determination as to whether the computer received a user input to upload a new dataset to the computer (step 908). If the computer determines that a user input was not received to upload a new dataset to the computer, no output of step 908, then the process terminates thereafter. If the computer determines that the computer received a user input to upload a new dataset to the computer, yes output of step 908, then the computer computes a set of semantics corresponding to the new dataset (step 910). In addition, the computer stores the new dataset and the set of semantics corresponding to the new dataset in the storage device of the computer (step 912).

Further, the computer calculates a relatedness score between the dataset (i.e., the existing dataset or the new dataset) and a plurality of candidate data analysis assets (i.e., machine learning models and source codes) stored on the computer based on semantics corresponding to the dataset and semantics corresponding to each candidate data analysis asset of the plurality of candidate data analysis assets (step 914). Afterward, the computer selects those candidate data analysis assets having a corresponding relatedness score greater than a defined relatedness score threshold value (step 916). Furthermore, the computer ranks those candidate data analysis assets having a corresponding relatedness score greater than the defined relatedness score threshold value by score (step 918). In addition, the computer lists those candidate data analysis assets having a corresponding relatedness score greater than the defined relatedness score threshold value by rank from highest to lowest (step 920).

Moreover, the computer inserts a justification for each candidate data analysis asset in the ranked list of candidate data analysis assets (step 922). Subsequently, the computer outputs the ranked list of candidate data analysis assets along with each respective justification on a display device for user review (step 924). Optionally, the computer automatically selects a highest-ranking candidate data analysis asset in the ranked list of candidate analysis assets (step 926). In addition, the computer applies the highest-ranking candidate data analysis asset to the dataset to classify the dataset for performing a particular task using the dataset (step 928). Thereafter, the process terminates.

Figure 10:
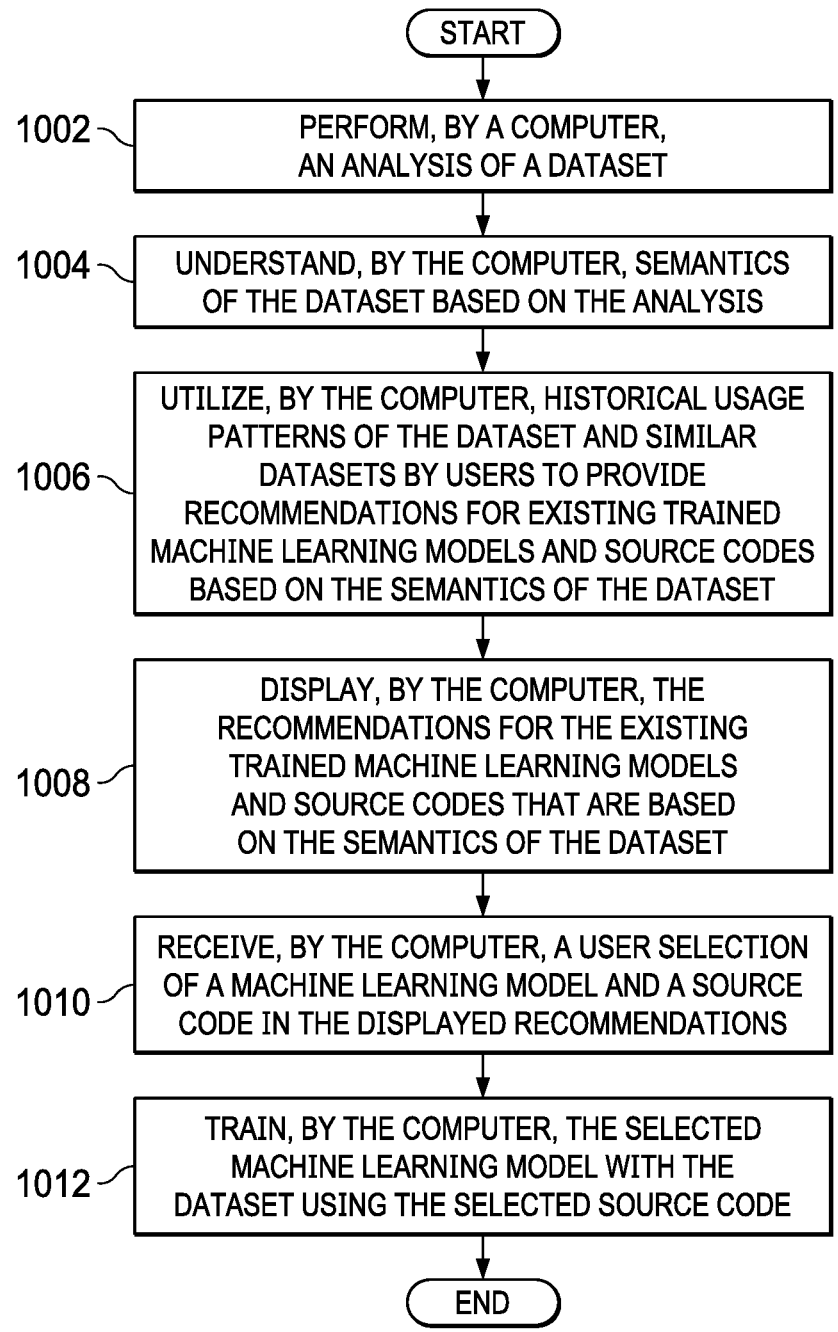
FIG. 10 is a flowchart illustrating a process for training a machine learning model in accordance with an illustrative embodiment.

With reference now to FIG. 10, a flowchart illustrating a process for training a machine learning model is shown in accordance with an illustrative embodiment. The process shown in FIG. 10 may be implemented in a computer, such as, for example, server 104 in FIG. 1, data processing system 200 in FIG. 2, data engineering platform 300 in FIG. 3, or data engineering platform 406 in FIG. 4.

The process begins when the computer performs an analysis of a dataset (step 1002). The computer understands semantics of the dataset based on the analysis (step 1004). The computer utilizes historical usage patterns of the dataset and similar datasets by users to provide recommendations for existing trained machine learning models and source codes based on the semantics of the dataset (step 1006).

The computer displays the recommendations for the existing trained machine learning models and source codes that are based on the semantics of the dataset (step 1008). Afterward, the computer receives a user selection of a machine learning model and a source code in the displayed recommendations (step 1010). The computer trains the selected machine learning model with the dataset using the selected source code (step 1012). Thereafter, the process terminates.

Thus, illustrative embodiments of the present invention provide a computer-implemented method, computer system, and computer program product for recommending available shared pre-trained machine learning models and source codes that can be applied to classify a given dataset and recommending available shared source codes that can train a machine learning model using the given dataset. Illustrative embodiments analyze existing machine learning models that are created and trained by other users and rank the machine learning models for the given dataset. In addition, illustrative embodiments maintain lineage (provenance) of all the datasets, trained machine learning models, and source codes on a data engineering platform. Further, illustrative embodiments index the existing catalog of trained-machine learning models and source codes available on the data engineering platform based on the analysis. Furthermore, illustrative embodiments calculate relatedness between a given dataset and stored machine learning models and source codes with the intent of recommending trained machine learning models and source codes for the given dataset. It should be noted that illustrative embodiments do not generate new machine learning models or source codes for recommendation, but instead illustrative embodiments analyze the existing trained machine learning models and source codes created or written by other users to find the best matching machine learning model and source code for the given dataset. As a result, illustrative embodiments provide a data engineering platform where users can upload datasets, train machine learning models, write source codes, and share all of these in a collaborative way.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for asset recommendation for a particular input dataset, the computer-implemented method comprising:
   selecting, by a computer, candidate machine learning models and source codes having a corresponding relatedness score to the particular input dataset greater than a defined relatedness score threshold value;
   ranking, by the computer, those selected candidate machine learning models and source codes having a corresponding relatedness score greater than the defined relatedness score threshold value by score to form a ranked list of selected candidate machine learning models and source codes;
   selecting, by the computer, one of a highest-ranking candidate machine learning model or a highest-ranking candidate source code in the ranked list of selected candidate machine learning models and source codes as a highest-ranking data analysis asset to classify the particular input dataset:
   applying, by the computer, the highest-ranking data analysis asset to the particular input dataset to classify the particular input dataset for performing a task using the particular input dataset:
   performing, by the computer, an analysis of the particular input dataset to determine semantics corresponding to the particular input dataset;
   providing, by the computer, recommendations for the selected candidate machine learning models and source codes based on the semantics corresponding to the particular input dataset; and
   training, by one of the candidate source codes, one of the candidate machine learning models using the particular input dataset.

2. The computer-implemented method of claim 1 further comprising:
   calculating, by the computer, a relatedness score between the particular input dataset and the selected candidate machine learning models and source codes based on semantics corresponding to the particular input dataset and semantics corresponding to each candidate machine learning model and source code of the selected candidate machine learning models and source codes.

3. The computer-implemented method of claim 2, wherein the relatedness score is a measure of strength of relationship between a particular candidate machine learning model and the particular input dataset and a particular candidate source code and the particular input dataset.

4. The computer-implemented method of claim 2, wherein the semantics corresponding to the particular input dataset include at least one of structure and content of the particular input dataset, types of users who have used the particular input dataset previously, types of problems that users were trying to solve using the particular input dataset, types of data pattern analysis algorithms, data transformations, and source codes previously applied to the particular input dataset, and machine learning models previously trained using the particular input dataset.

5. The computer-implemented method of claim 2, wherein the semantics corresponding to each candidate machine learning model and source code include domain, structure, and content of data used to train each particular candidate machine learning model and source code.

6. The computer-implemented method of claim 1 further comprising:
utilizing, by the computer, a user profile of a user to assist in providing the recommendations for the selected candidate machine learning models and source codes, wherein the user profile comprises a user type of the user and historical usage patterns that represent a pattern of dataset usage by the user.

7. The computer-implemented method of claim 1 further comprising:
determining, by the computer, whether a user input was received to open an existing dataset stored on the computer; and
responsive to the computer determining that a user input was received to open an existing dataset stored on the computer, retrieving, by the computer, a pre-computed set of semantics corresponding to the existing dataset from a storage device of the computer.

8. The computer-implemented method of claim 1 further comprising:
determining, by the computer, whether a user input was received to upload a new dataset to the computer;
responsive to the computer determining that a user input was received to upload a new dataset to the computer, computing, by the computer, a set of semantics corresponding to the new dataset; and
storing, by the computer, the new dataset and the set of semantics corresponding to the new dataset in a storage device of the computer.

9. The computer-implemented method of claim 1 further comprising:
displaying, by the computer, the recommendations for the candidate machine learning models and source codes to form displayed recommendations.

10. The computer-implemented method of claim 9 further comprising:
receiving, by the computer, a user selection of a particular machine learning model and source code in the displayed recommendations.

11. The computer-implemented method of claim 1, wherein the computer is a data engineering platform located in a cloud environment.

12. A computer system for asset recommendation for a particular input dataset, the computer system comprising:
a bus system;
a storage device connected to the bus system, wherein the storage device stores program instructions; and
a processor connected to the bus system, wherein the processor executes the program instructions to:
select candidate machine learning models and source codes having a corresponding relatedness score to the particular input dataset greater than a defined relatedness score threshold value;
rank those selected candidate machine learning models and source codes having a corresponding relatedness score greater than the defined relatedness score threshold value by score to form a ranked list of selected candidate machine learning models and source codes;
select one of a highest-ranking candidate machine learning model or a highest- ranking candidate source code in the ranked list of selected candidate machine learning models and source codes as a highest-ranking data analysis asset to classify the particular input dataset;
apply the highest-ranking data analysis asset to the particular input dataset to classify the particular input dataset for performing a task using the particular input dataset;
perform an analysis of the particular input dataset to determine semantics corresponding to the particular input dataset;
providing recommendations for the selected candidate machine learning models and source codes based on the semantics corresponding to the particular input dataset; and
train, by one of the candidate source codes, one of the candidate machine learning models using the particular input dataset.

13. The computer system of claim 12, wherein the processor further executes the program instructions to:
calculate a relatedness score between the particular input dataset and the selected candidate machine learning models and source codes based on semantics corresponding to the particular input dataset and semantics corresponding to each candidate machine learning model and source code of the plurality of selected candidate machine learning models and source codes.

14. A computer program product for asset recommendation for a particular input dataset, the computer program product comprising a computer readable storage medium having program instructions embodied therewith, the program instructions executable by a computer to cause the computer to perform a method comprising:
selecting, by the computer, candidate machine learning models and source codes having a corresponding relatedness score to the particular input dataset greater than a defined relatedness score threshold value;
ranking, by the computer, those selected candidate machine learning models and source codes having a corresponding relatedness score greater than the defined relatedness score threshold value by score to form a ranked list of selected candidate machine learning models and source codes;
selecting, by the computer, one of a highest-ranking candidate machine learning model or a highest-ranking candidate source code in the ranked list of selected candidate machine learning models and source codes as a highest-ranking data analysis asset to classify the particular input dataset:
applying, by the computer, the highest-ranking data analysis asset to the particular input dataset to classify the particular input dataset for performing a task using the particular input dataset:
performing, by the computer, an analysis of the particular input dataset to determine semantics corresponding to the particular input dataset;

providing, by the computer, recommendations for the selected candidate machine learning models and source codes based on the semantics corresponding to the particular input dataset; and training, by one of the candidate source codes, one of the candidate machine learning models using the particular input dataset.

15. The computer program product of claim 14 further comprising:

calculating, by the computer, a relatedness score between the particular input dataset and the selected candidate machine learning models and source codes based on semantics corresponding to the particular input dataset and semantics corresponding to each candidate machine learning model and source code of the selected candidate machine learning models and source codes.

16. The computer program product of claim 15, wherein the relatedness score is a measure of strength of relationship between a particular candidate machine learning model and the particular input dataset and a particular candidate source code and the particular input dataset.

17. The computer program product of claim 15, wherein the semantics corresponding to the particular input dataset include at least one of structure and content of the particular input dataset, types of users who have used the particular input dataset previously, types of problems that users were trying to solve using the particular input dataset, types of data pattern analysis algorithms, data transformations, and source codes previously applied to the particular input dataset, and machine learning models previously trained using the particular input dataset.

18. The computer program product of claim 15, wherein the semantics corresponding to each candidate machine learning model and source code include domain, structure, and content of data used to train each particular candidate machine learning model and source code.

19. The computer program product of claim 14 further comprising:

utilizing, by the computer, a user profile of a user to assist in providing the recommendations for the selected candidate machine learning models and source codes, wherein the user profile comprises a user type of the user and historical usage patterns that represent a pattern of dataset usage by the user.

20. The computer program product of claim 14 further comprising:

determining, by the computer, whether a user input was received to open an existing dataset stored on the computer; and responsive to the computer determining that a user input was received to open an existing dataset stored on the computer, retrieving, by the computer, a pre-computed set of semantics corresponding to the existing dataset from a storage device of the computer.

21. The computer program product of claim 14 further comprising:

determining, by the computer, whether a user input was received to upload a new dataset to the computer;

responsive to the computer determining that a user input was received to upload a new dataset to the computer, computing, by the computer, a set of semantics corresponding to the new dataset; and storing, by the computer, the new dataset and the set of semantics corresponding to the new dataset in a storage device of the computer.

22. The computer program product of claim 14 further comprising:

displaying, by the computer, the recommendations for the candidate machine learning models and source codes to form displayed recommendations.

23. The computer program product of claim 22 further comprising:

receiving, by the computer, a user selection of a particular machine learning model and source code in the displayed recommendations.

\* \* \* \* \*